(No Model.)
W. WAINWRIGHT.
LAWN IRRIGATOR.
No. 414,346. Patented Nov. 5, 1889.
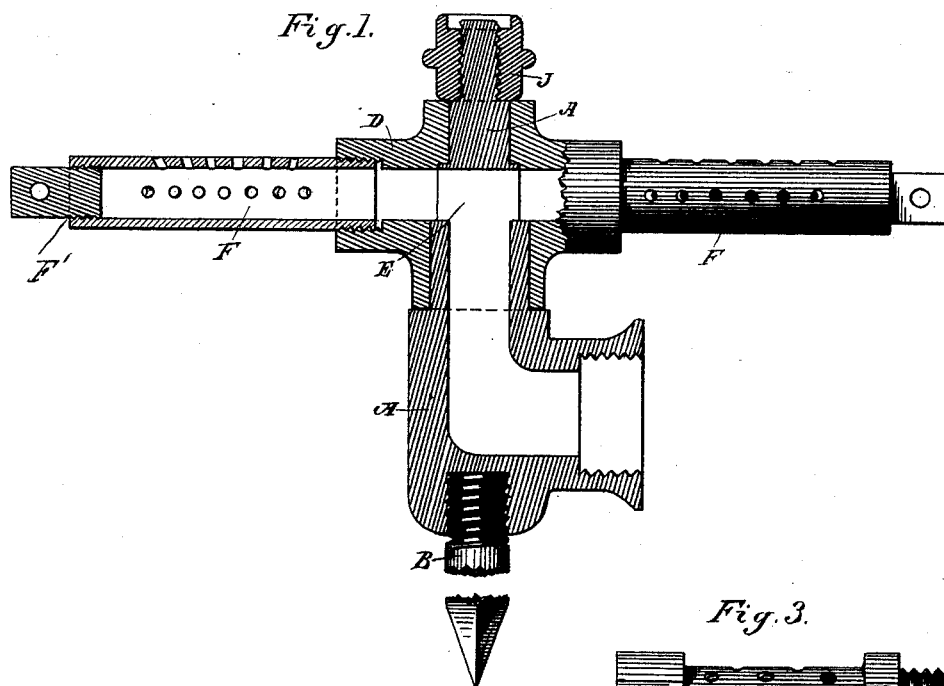
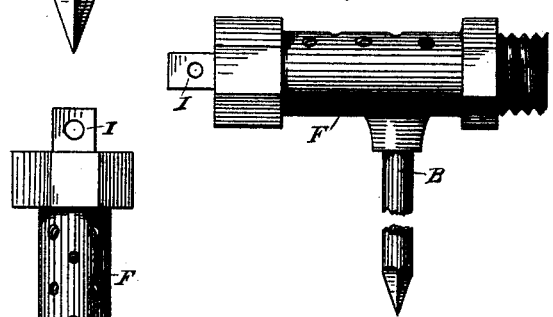
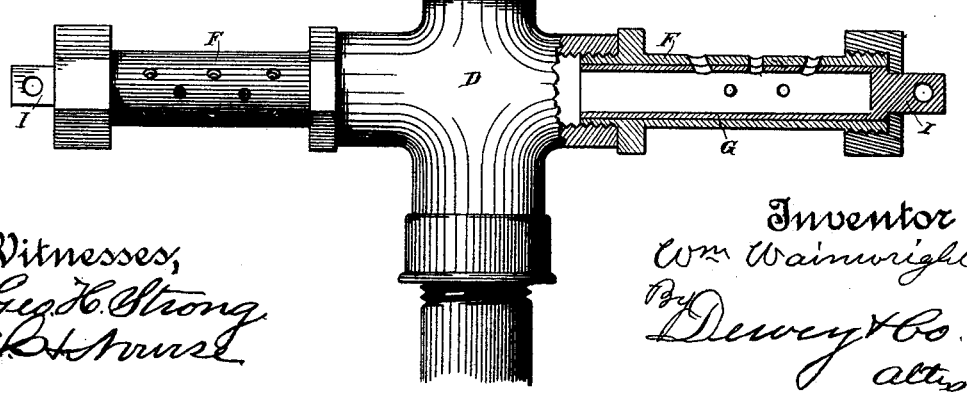
Witnesses,
Geo. H. Strong
J. H. Nurse
Inventor,
Wm Wainwright
By Dewey & Co.
attys

UNITED STATES PATENT OFFICE.

WILLIAM WAINWRIGHT, OF SAN FRANCISCO, CALIFORNIA.

LAWN-IRRIGATOR.

SPECIFICATION forming part of Letters Patent No. 414,346, dated November 5, 1889.

Application filed November 5, 1887. Serial No. 254,428. (No model.)

*To all whom it may concern:*

Be it known that I, WILLIAM WAINWRIGHT, of the city and county of San Francisco, State of California, have invented an Improvement in Lawn-Irrigators; and I hereby declare the following to be a full, clear, and exact description of the same.

My invention relates to an improved adjustable lawn-irrigator; and it consists of a socket having one or more discharge-openings, either vertical, horizontal, stationary, or rotary, and a means for adjusting and regulating said openings, all of which will be more fully explained by reference to the accompanying drawings, in which—

Figure 1 is a view showing a socket fitted to receive a screw-nozzle of a hose, and having a supporting spike or standard; showing also the rotary perforated adjustable arms. Fig. 2 is a view showing the horizontal and vertical perforated arms fixed upon a stationary socket. Fig. 3 shows a modification of the stationary spraying device.

A is a socket, which is preferably made of metal, and has a screw-opening in one side through which connection may be made with a hose or other supply. From the lower end of this socket a spike or standard B projects, so that it may be forced into the ground and hold the device in proper position while at work. The upper end of the socket is turned, forming a vertical spindle, to receive the cross D, which fits easily upon it, so as to be rotated by the reactionary force of the water passing through the discharge-arms. The interior of the cross has an enlarged chamber, so that water passing up into it will escape through openings E in the vertical spindle, and through this enlargement or chamber the water can pass constantly into the horizontal arms or passages F, which extend outwardly from the cross, as shown. These arms or passages are perforated on opposite sides, so as to allow the water to escape from them, and by reactionary force to cause the cross and arms to rotate, thus discharging water and distributing it over a considerable space.

F' is a screw-plug, removable to allow the interior of the arms to be cleaned. In order to regulate this discharge, sleeves G are fitted inside of the perforated arms and have holes bored through them corresponding with those in the arms. These sleeves have extensions or shanks I projecting out through the ends of the arms, and the shanks have holes made through them transversely, or they may be square, so that a wrench can be fitted upon them, if desired, so that by a pin passing through the hole, or by the wrench, these sleeves may be turned so as to close the openings through the radial arms to a greater or less extent by throwing the openings in the sleeves out of line with those in the arms. These sleeves may be turned so that the openings in them will correspond with the lower sides of the openings in the arms, when the discharge will be thrown upward, or if turned so that the lower sides of the openings in the sleeves correspond with the upper sides of the openings of the arms the discharge will be thrown downward, while if brought exactly opposite, so that they correspond in every particular, the discharge will be thrown out more or less horizontally, as may be desired. It will be manifest that by such adjustments these sleeves will also increase or diminish the amount of water which will be thrown by the arms. It will also be seen that the adjustable sleeves may be either outside or inside, as desired.

If it is desired to make the arms stationary, the nut J, which screws down upon the top of the spindle and retains the rotary arm in place, may be reversed, the opposite end of it being chambered, so that it will screw down upon the top of the cross and prevent its rotating, thus making a stationary sprinkler.

In many cases two, three, or more arms may be attached to the socket, projecting either radially, horizontally, or vertically, in which case the device may be made stationary or rotary, as may be desired.

Having thus described my invention, what I claim as new, and desire to secure by Letters Patent, is—

1. The spraying-nozzle having the hollow screw-socket and supporting-standard, and the vertical spindle with the horizontally-rotating cross or perforated arms fitted thereto, in combination with the supplemental sleeve having corresponding perforations, said sleeve being adjustable so as to change the position of its openings with relation to those in the arms, substantially as herein described.

2. The hollow screw-socket adapted to fit upon a coupling of a hose or water-supply pipe, arms extending outwardly from said socket and having perforations for the discharge and distribution of water, in combination with supplemental rotary sleeves and a means for turning the same, said sleeves being provided with holes or openings, which may be made to correspond in greater or less degree with those in the arms, or turned so as to shut off the discharge altogether, substantially as herein described.

In witness whereof I have hereunto set my hand.

WILLIAM WAINWRIGHT.

Witnesses:
S. H. NOURSE,
H. C. LEE.